United States Patent
Li

(10) Patent No.: US 12,105,558 B2
(45) Date of Patent: Oct. 1, 2024

(54) AI HEAD-MOUNTED COMPUTER

(71) Applicant: RealWear (Shanghai) Intelligent Technology Co., Ltd, Shanghai (CN)

(72) Inventor: Bo Li, Shanghai (CN)

(*) Notice: Subject to any disclaimer, the term of this patent is extended or adjusted under 35 U.S.C. 154(b) by 0 days.

(21) Appl. No.: 17/788,267

(22) PCT Filed: Oct. 14, 2021

(86) PCT No.: PCT/CN2021/123831
§ 371 (c)(1),
(2) Date: Jun. 22, 2022

(87) PCT Pub. No.: WO2023/024224
PCT Pub. Date: Mar. 2, 2023

(65) Prior Publication Data
US 2024/0168520 A1     May 23, 2024

(30) Foreign Application Priority Data

Aug. 27, 2021 (CN) .......................... 202110992003.8

(51) Int. Cl.
*G06F 1/16*     (2006.01)
(52) U.S. Cl.
CPC .................... *G06F 1/163* (2013.01)
(58) Field of Classification Search
CPC .............. G02B 27/017; G02B 27/0176; G02B 27/0179; G02B 2027/014; G06F 1/163
See application file for complete search history.

(56) References Cited

U.S. PATENT DOCUMENTS

| 10,288,889 | B2 * | 5/2019 | Eromaki | G02B 27/0176 |
| 11,803,064 | B1 * | 10/2023 | Li | G02B 27/0176 |
| 2015/0378160 | A1 * | 12/2015 | Lee | G02B 27/0172 345/8 |
| 2018/0003985 | A1 * | 1/2018 | Eromaki | G02B 27/0176 |
| 2019/0113760 | A1 * | 4/2019 | Tatsuta | G02B 27/0176 |
| 2023/0010650 | A1 * | 1/2023 | Pombo | G02B 27/0172 |
| 2024/0036334 | A1 * | 2/2024 | Madden | F16M 13/04 |

FOREIGN PATENT DOCUMENTS

| CN | 205408118 U | 7/2016 |
| CN | 105866957 A | 8/2016 |
| CN | 206961024 U | 2/2018 |
| CN | 207687604 U | 8/2018 |
| CN | 211741967 U | 10/2020 |

\* cited by examiner

*Primary Examiner* — Anthony Q Edwards

(57) ABSTRACT

The invention discloses an AI head-mounted computer, which comprises a main body part and a display connected on the main body part through a first connecting arm and a second connecting arm, the main body part, the first connecting arm and the second connecting arm are sequentially and rotationally matched, the rotating planes of the main body part, the first connecting arm and the second connecting arm are the same plane, and the display is connected with the second connecting arm through a connecting assembly. One end of the connecting assembly is in rotating fit with the second connecting arm, so that the displayer can rotate on the plane perpendicular to the plane where the second connecting arm rotates, the other end of the connecting assembly is in rotating fit with the displayer, so that the displayer can rotate automatically, and a wiring channel is formed in the connecting assembly.

8 Claims, 9 Drawing Sheets

AI HEAD-MOUNTED COMPUTER

1. TECHNICAL FIELD

The invention relates to the technical field of wearable devices, in particular to an AI head-mounted computer.

2. BACKGROUND

With the emergence of microdisplays, they are widely used in combination with head-mounted structures to be worn on the user's head for use, forming an AI head-mounted computer, similar in shape to glasses and headphones. Generally, it mainly comprises a main body part and a display module, and its chip, power supply part and other components such as wireless interfaces are integrated on the main body part. The chip generally has an integrated data processor and other input functions, such as speech recognition circuit, program software or signal recognition, etc. However, in addition to focusing on the development of its functionality, the current AI head-mounted computer has some problems in the optimization design of the structure. In order to satisfy the cooperation between the display and the glasses of different users, a plurality of connecting arms are often provided between the display and the main body part to facilitate the adjustment of the specific position of the display. At this time, the overall size of the AI head-mounted computer is large, which is very inconvenient to carry.

The invention improves on this problem to improve its application range and convenience of use. Therefore, an AI head-mounted computer is proposed.

3. SUMMARY OF THE INVENTION

The purpose of the invention is to provide an AI head-mounted computer. Through the optimized design of the structure between the display and the main body part, the AI head-mounted computer can be stored as a whole, so as to reduce the overall size and be more portable.

In order to achieve the above purpose, the main technical scheme adopted in the invention includes:

an AI head-mounted computer, comprising a main body part and a display connected on the main body part through a first connecting arm and a second connecting arm, wherein the main body part, the first connecting arm, and the second connecting arm are sequentially and rotatably matched, and the rotating planes of the main body part, the first connecting arm, and the second connecting arm are the same plane; the display is connected to the second connecting arm through a connecting assembly; one end of the connecting assembly is rotatably matched with the second connecting arm, so that the display can rotate on the plane perpendicular to the plane where the second connecting arm rotates; the other end of the connecting assembly is rotatably matched with the display, so that the display can rotate automatically; the connecting assembly is provided with a cable channel, so that the outer side end of the cable enters the display from the second connecting arm, and the other end of the cable sequentially passes through the second connecting arm and the first connecting arm and is connected to the chip in the main body part.

Preferably, the connecting assembly comprises a first connecting shaft and a second connecting shaft arranged vertically; the first connecting shaft is rotatably matched with the display, so that the display can rotate automatically; the second connecting shaft is rotatably matched with the second connecting arm, and the first connecting shaft and the second connecting shaft are rotatably matched, so that the first connecting shaft can be rotated relative to the second connecting shaft, thereby driving the display to rotate on the plane perpendicular to the plane where the second connecting arm rotates.

Preferably, the first connecting shaft is provided with a hollow inner cavity, and the hollow inner cavity forms part of the cable channel.

Preferably, the second connecting shaft is arranged inside the second connecting arm; a first gap is provided between the inner walls on both sides of the second connecting arm and the radially corresponding side of the second connecting shaft, and the first gap forms part of the cable channel; the end of the display is provided with a cover, and one end of the cover extends into one of the first gaps and blocks the first gap; the outer side end of the cable enters into the hollow inner cavity of the first connecting shaft through another first gap; the first connecting shaft and the second connecting shaft are connected through a first shaft connecting part in the connecting assembly.

Preferably, the second connecting shaft is arranged outside the second connecting arm; a second gap is provided between the second connecting arm and the second connecting shaft, and the second gap forms part of the cable channel; the outer side end of the cable enters the hollow inner cavity of the first connecting shaft through the second gap; the first connecting shaft and the second connecting shaft are connected through a second shaft connecting part in the connecting assembly.

Preferably, the second connecting shaft is arranged inside the second connecting arm; a third gap is provided between one end of the second connecting shaft and the side inner wall of the second connecting arm, and the end of the second connecting shaft is recessed inward in the axial direction to form a groove; the first connecting shaft and the second connecting shaft are connected through a third connecting shaft, and both ends of the inner cavity of the third connecting shaft are respectively communicated with the hollow inner cavity of the first connecting shaft and the groove of the second connecting shaft to form part of the cable channel.

Preferably, one end of the second connecting shaft is fixed to the side inner wall of the second connecting arm through the third shaft connecting part.

Preferably, the second connecting shaft is located outside the second connecting arm, and the outside thereof is sleeved with a shaft sleeve; one end of the shaft sleeve is fixed at the end of the display; the shaft sleeve is provided with a shaft sleeve cavity communicating with the hollow inner cavity of the first connecting arm; the other end of the shaft sleeve is coaxially and rotatably matched with a fourth shaft connecting part; the end of the fourth shaft connecting part extends into the second connecting arm and is fixed with the second connecting arm, and the fourth shaft connecting part communicates the shaft sleeve cavity with the inner cavity of the second connecting arm through a provided through hole.

Preferably, the first connecting arm is divided into a first part and a second part from the middle part, and the first part and the second part are rotatably matched, so that the first part and the second part can be rotated to a state of being stacked with each other, and the second connecting arm and the display can be rotated into an accommodating groove provided on the main body part.

The invention at least has the following advantageous effects:

The AI head-mounted computer according to the invention can be rotated and stored on the second connecting arm by providing the display, and then the second connecting arm can be rotated relative to the first connecting arm, so that the overall size of the AI head-mounted computer is reduced, which is more convenient to carry to improve the convenience of use.

4. BRIEF DESCRIPTION OF ACCOMPANY DRAWINGS

The drawings described herein are used to provide further understanding of the application and constitute a part of the application. The schematic embodiments and descriptions of the application are used to explain the application and do not constitute an improper limitation of the application. In the accompany drawings.

5. SPECIFIC EMBODIMENT OF THE INVENTION

Figure 1:
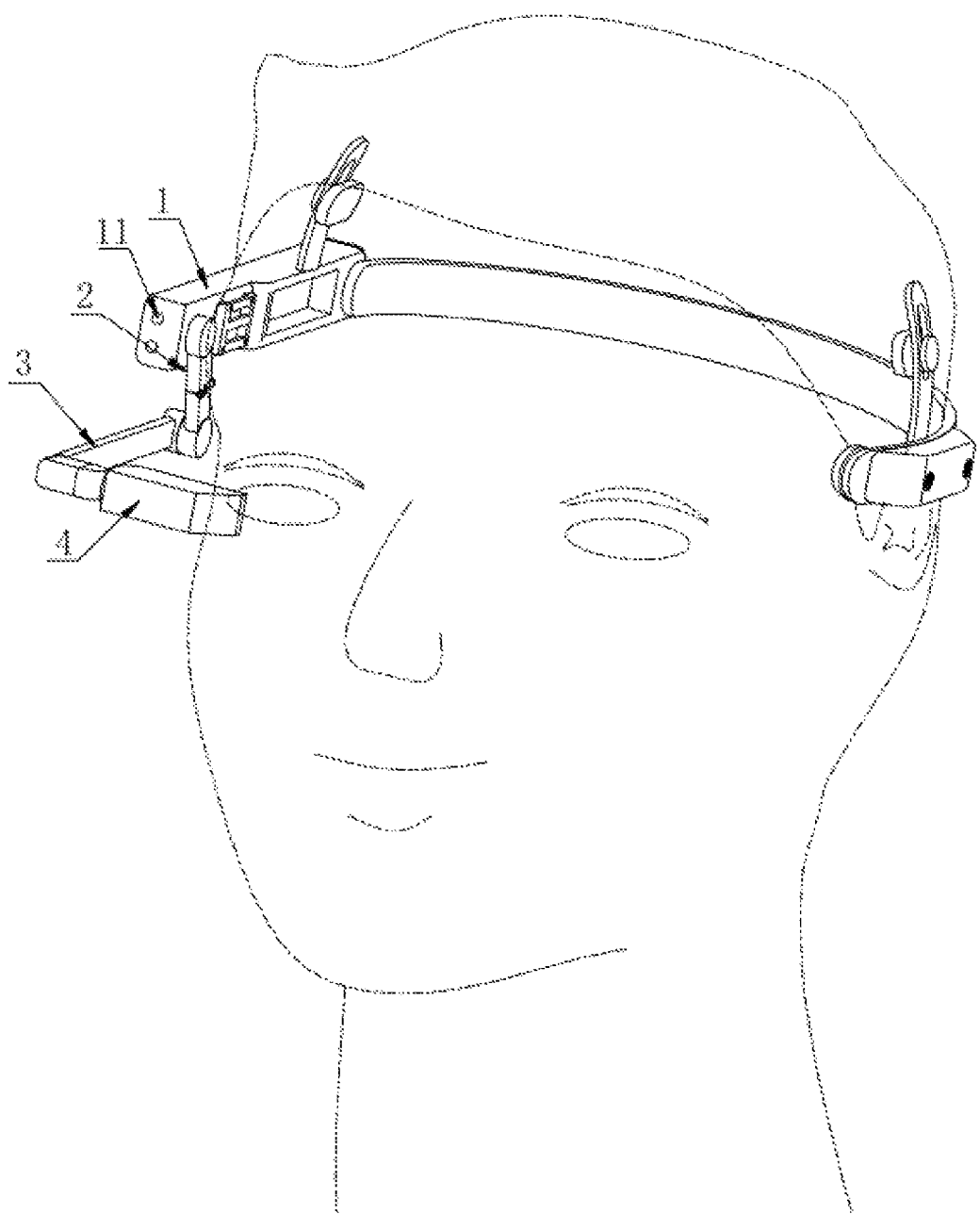
FIG. 1 is an overall head-mounted schematic diagram of the AI head-mounted computer according to the invention.
Figure 2:
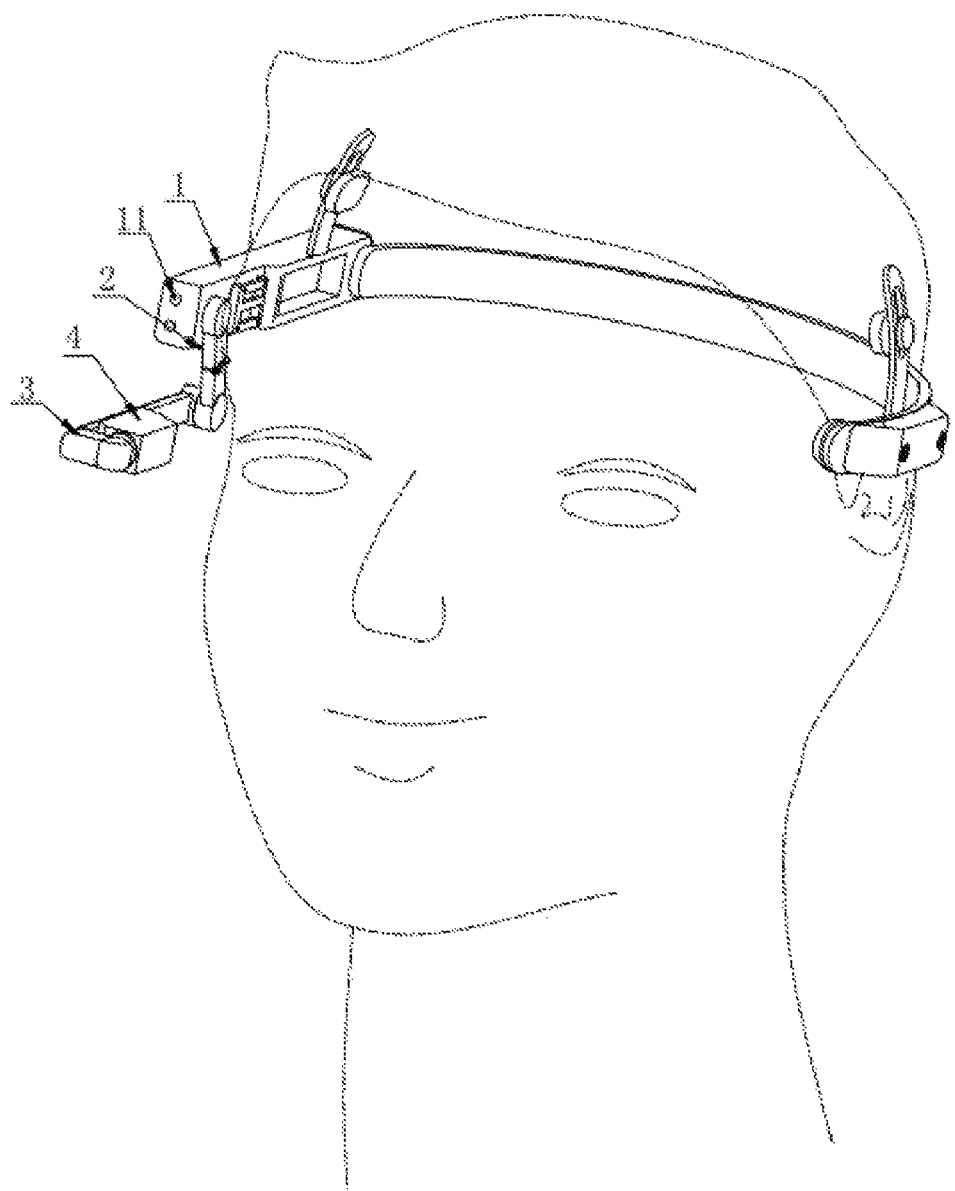
FIG. 2 is a schematic diagram of the overall head-mounted folding of the AI head-mounted computer according to the invention.
Figure 3:
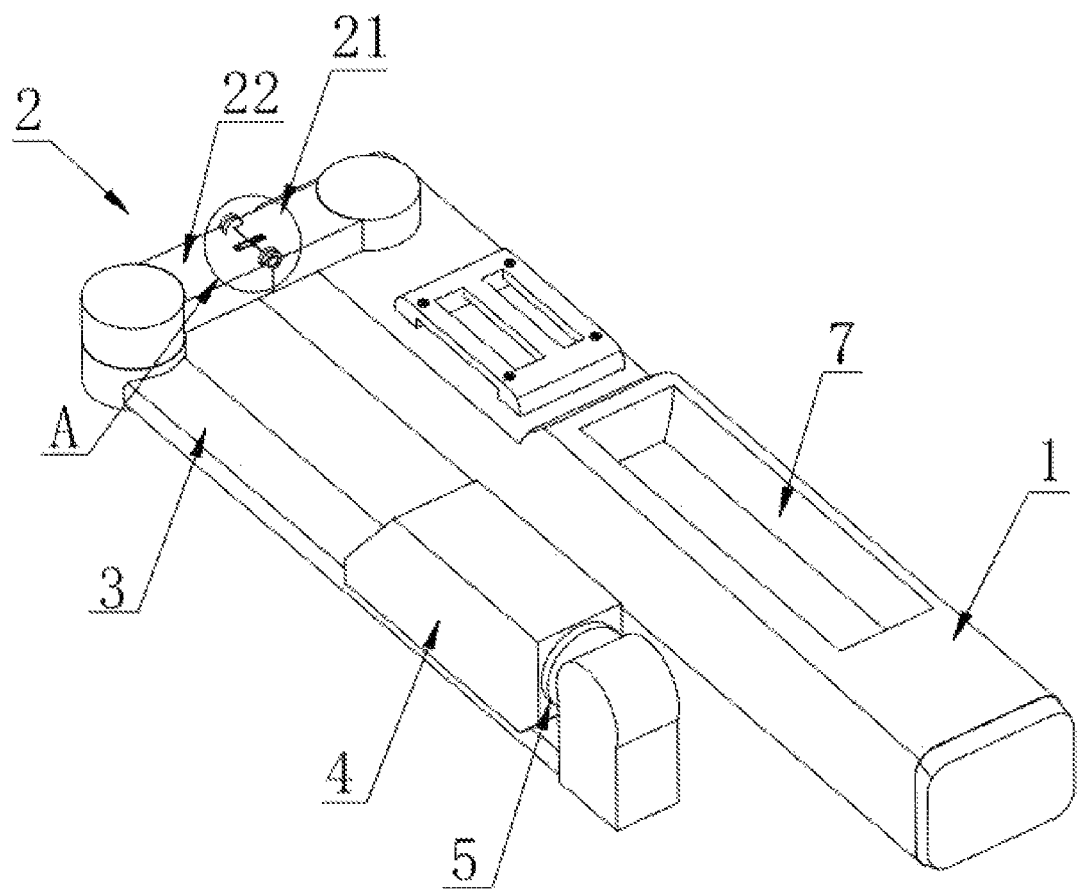
FIG. 3 is a schematic diagram of the main body part of the AI head-mounted computer according to the invention.
Figure 4:
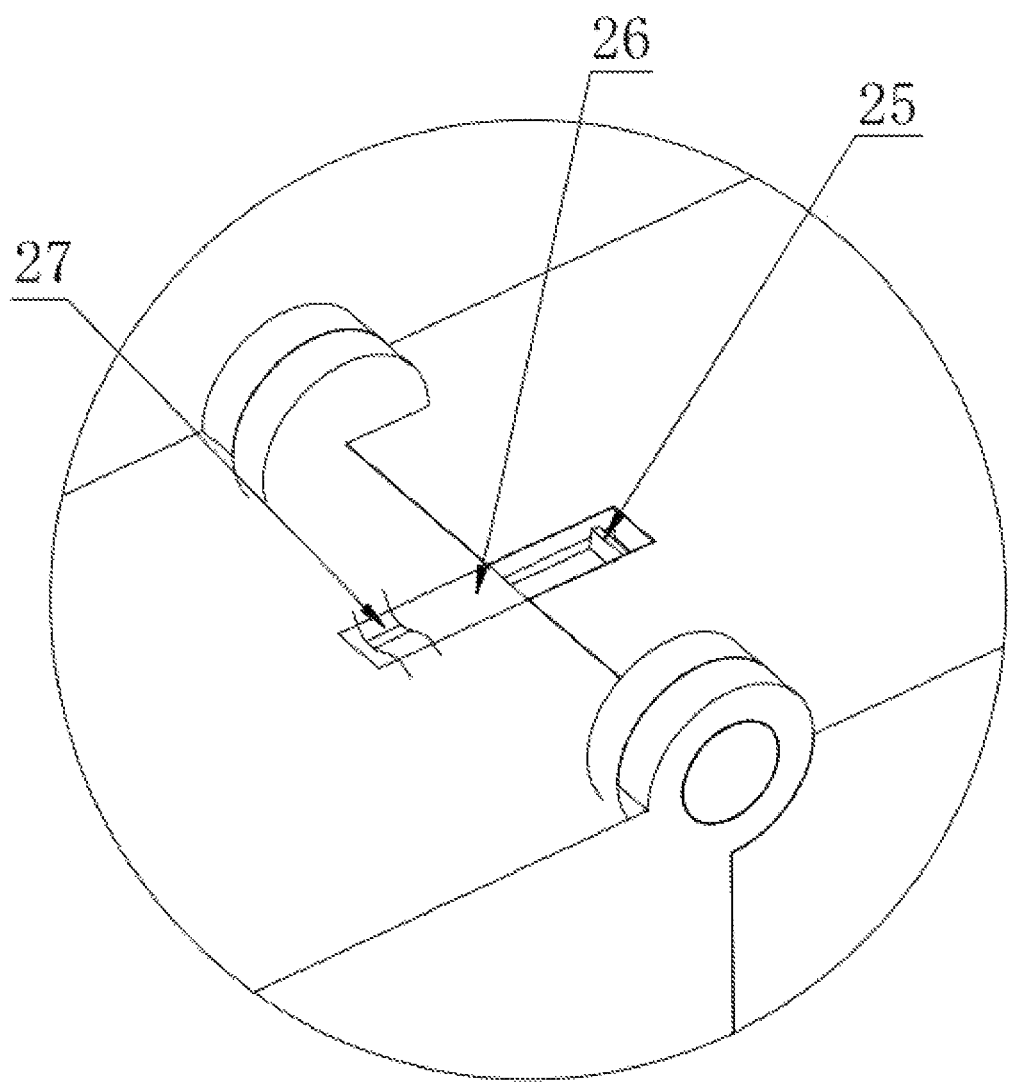
FIG. 4 is a schematic structural diagram of part A in FIG. 1 of the AI head-mounted computer according to the invention.
Figure 5:
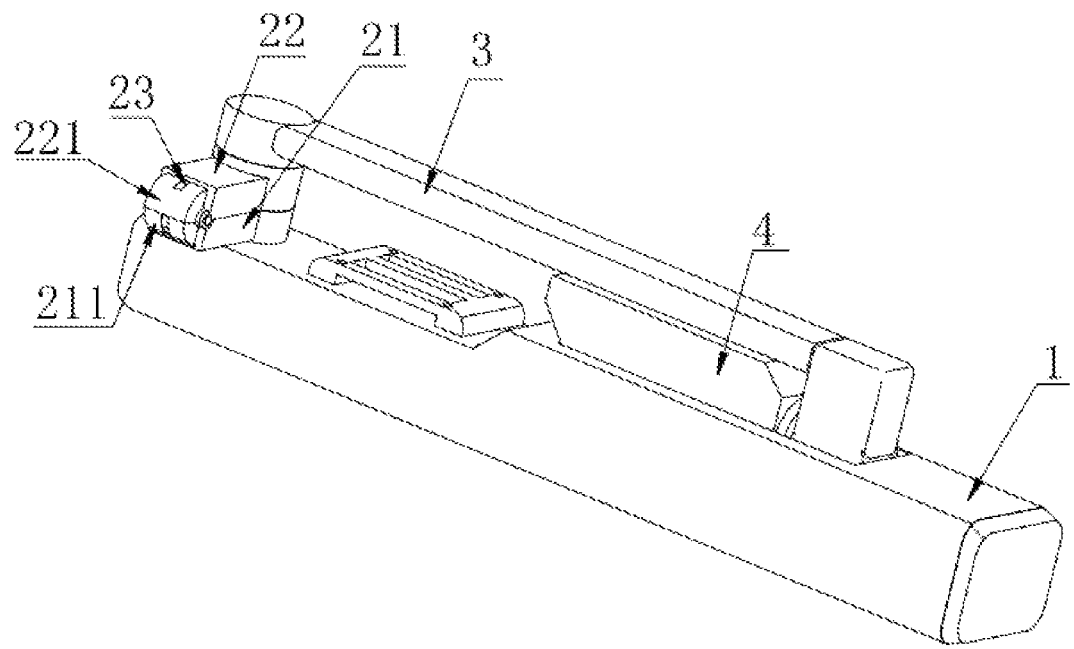
FIG. 5 is a schematic diagram of the AI head-mounted computer according to the invention after being folded.
Figure 6:
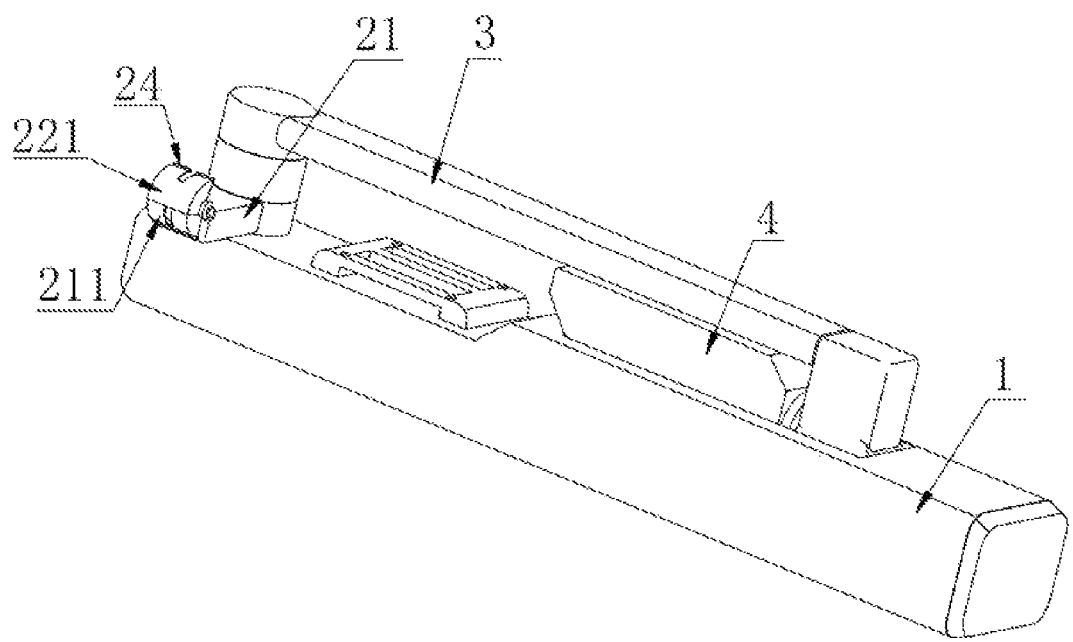
FIG. 6 is a schematic diagram of a protruding part of the AI head-mounted computer according to the invention.

The embodiments of the application will be described in detail hereinafter with reference to the accompanying drawings and examples, so as to fully understand and implement the implementation process of how to apply technical means to solve technical problems and achieve technical effects in the application.

With reference to FIGS. 1-13, the invention provides an AI head-mounted computer, comprising a main body part 1 and a display 4 connected on the main body part 1 through a first connecting arm 2 and a second connecting arm 3, wherein the main body part 1, the first connecting arm 2, and the second connecting arm 3 are sequentially and rotatably matched, and the rotating planes of the main body part 1, the first connecting arm 2, and the second connecting arm 3 are the same plane; the front end of the main body part 1 is provided with a camera module 11, and the camera module 11 is used for taking pictures or scanning; the display 4 is connected to the second connecting arm 3 through a connecting assembly 5; one end of the connecting assembly 5 is rotatably matched with the second connecting arm 3, so that the display 4 can rotate on the plane perpendicular to the plane where the second connecting arm 3 rotates; the other end of the connecting assembly 5 is rotatably matched with the display 4, so that the display 4 can rotate automatically; the connecting assembly 5 is provided with a cable channel 51, so that the outer side end of the cable enters the display 4 from the second connecting arm 3, and the other end of the cable sequentially passes through the second connecting arm 3 and the first connecting arm 2 and is connected to the chip in the main body part 1; after the user wears, by adjusting the first connecting arm 2 and the second connecting arm 3 to swing, the height of the display 4 and the distance from the human eye can be adjusted on the vertical plane; then, in coordination with the relative rotation of the display 4 and the second connecting arm 3, the left and right inclination angles of the display 4 can be adjusted, and in coordination with the automatic rotation of the display 4, the pitch angle of the display 4 is adjusted so that the display 4 is facing the human eye, which improves the comfort of the human eye when viewing.

The connecting assembly 5 comprises a first connecting shaft 52 and a second connecting shaft 53 arranged vertically; the first connecting shaft 52 is rotatably matched with the display 4, so that the display 4 can rotate automatically; specifically, one end of the first connecting shaft 52 is inserted into the end of the display 4, and is rotated and matched with the end of the display 4; in the specific implementation process, rotating connecting holes are provided at the end of the display 4, and annular connecting grooves are provided on the corresponding end surface of the first connecting shaft 52; during the closing process of the upper cover and the lower cover of the display shell 41, the inner walls of the two half-shaped connecting holes are respectively inserted into the annular connecting grooves; in the process of realizing the splicing of the display shell 41, the rotational connection between the display 4 and the first connecting shaft 52 can be completed; the second connecting shaft 53 is rotatably matched with the second connecting arm 3, and the first connecting shaft 52 and the second connecting shaft 53 are rotatably matched, so that the first connecting shaft 52 can be rotated relative to the second connecting shaft 53, thereby driving the display 4 to rotate on the plane perpendicular to the plane where the second connecting arm 3 rotates; the first connecting shaft 52 is provided with a hollow inner cavity, and the hollow inner cavity forms part of the cable channel, for the cable to enter the display shell 41 through the hollow inner cavity for signal connection with the module of the display 4.

Embodiment 1

Figure 7:
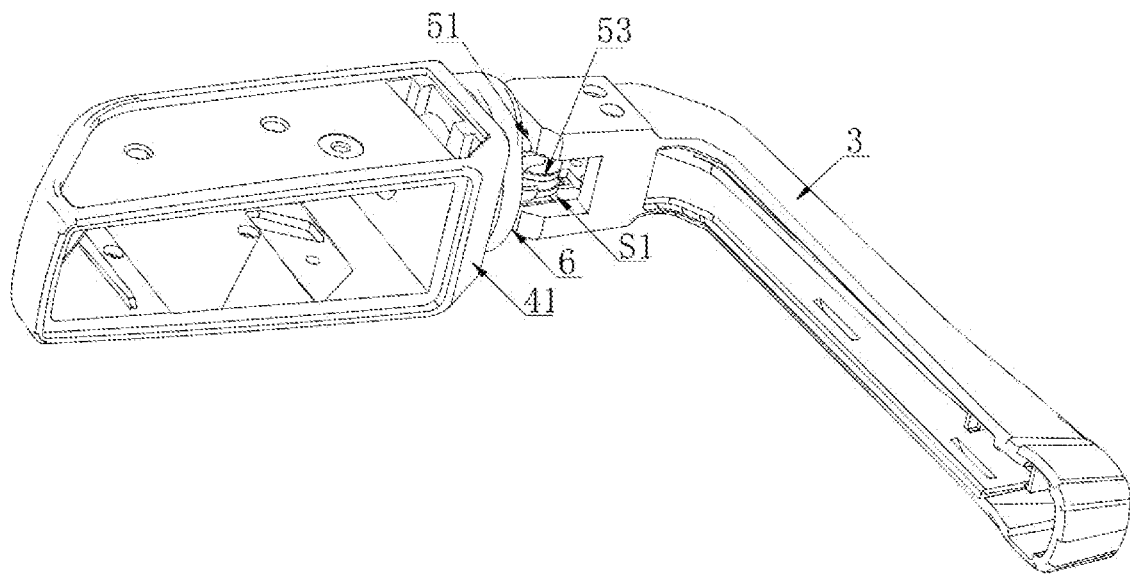
FIG. 7 is a schematic diagram of Embodiment 1 of the AI head-mounted computer according to the invention.
Figure 8:
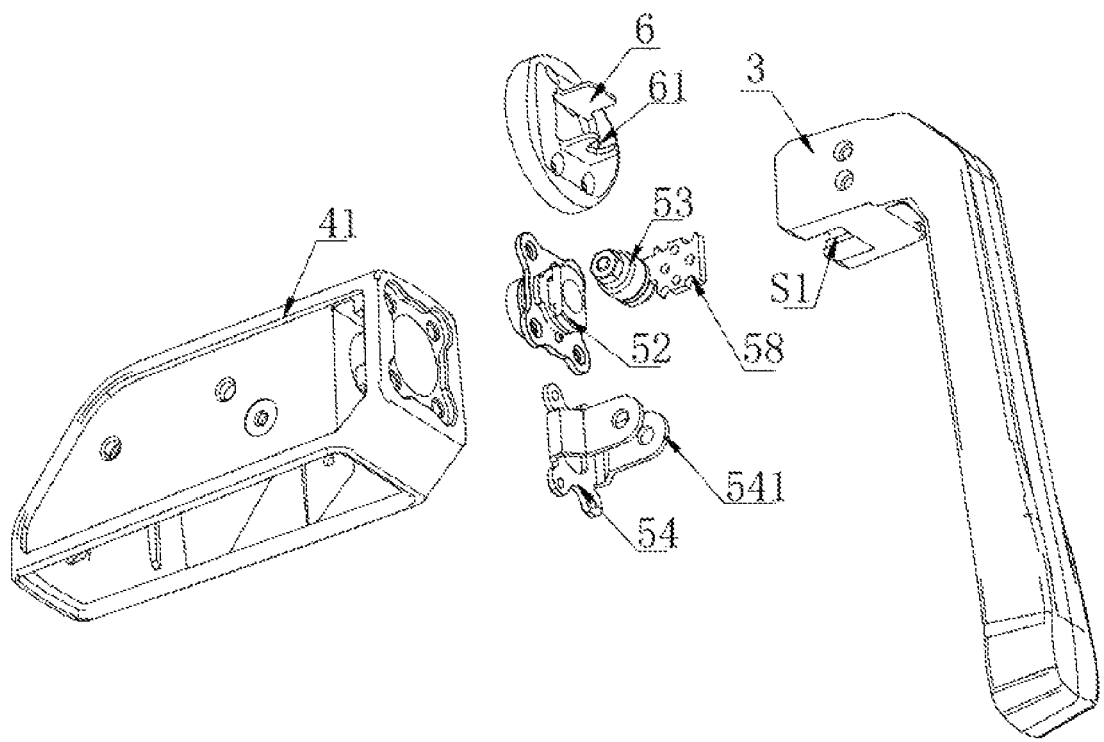
FIG. 8 is a schematic diagram of disassembly of Embodiment 1 of the AI head-mounted computer according to the invention.

With reference to FIGS. 7 and 8, the second connecting shaft 53 is arranged inside the second connecting arm 3; specifically, both ends of the second connecting shaft 53 are respectively connected to the inner walls of the corresponding sides of the second connecting arm 3; a first gap S1 is provided between the inner walls on both sides of the second connecting arm 3 and the radially corresponding side of the second connecting shaft 53, and the first gap S1 forms part of the cable channel; the end of the display 4 is provided with a cover 6, and one end of the cover 6 extends into one of the first gaps 1 and blocks the first gap 1; the outer side end of the cable enters into the hollow inner cavity of the first connecting shaft 52 through another first gap S1; the first connecting shaft 52 and the second connecting shaft 53 are connected through a first shaft connecting part 54 in the connecting assembly 5; in specific implementation, the second connecting shaft 53 is arranged parallel to the width direction of the second connecting arm 3; the two first gaps S1 are located at the open end of the second connecting arm 3 and are distributed on both sides in the thickness direction; the other end of the cover 6 also extends into another first gap S1, and the end of the cover 6 is formed with a via hole 61; the cable protrudes from the first gap S1 and enters the cover 6 through the via hole 61, and then extends into the display shell 41 through the hollow cavity of the first connecting shaft 52; specifically, one end of the shaft connection part 1 54 is fixed on the end of the display 4 and is movably sleeved outside the first connection shaft 52, and the other end thereof forms two first supporting plates 541; the two first supporting plates 541 are respectively rotatably matched with both ends of the second connecting shaft 53; the two first supporting plates 541 respectively protrude into the ends of the two first gaps S1 on the axial cover 6 of the second connecting shaft 53, so that the via hole 61 is located between the two first supporting plates 541; in this way, the display 4 can be freely rotated relative to the second connecting arm 3, and the shielding performance of the cable is improved by using the cover 6.

Embodiment 2

Figure 9:
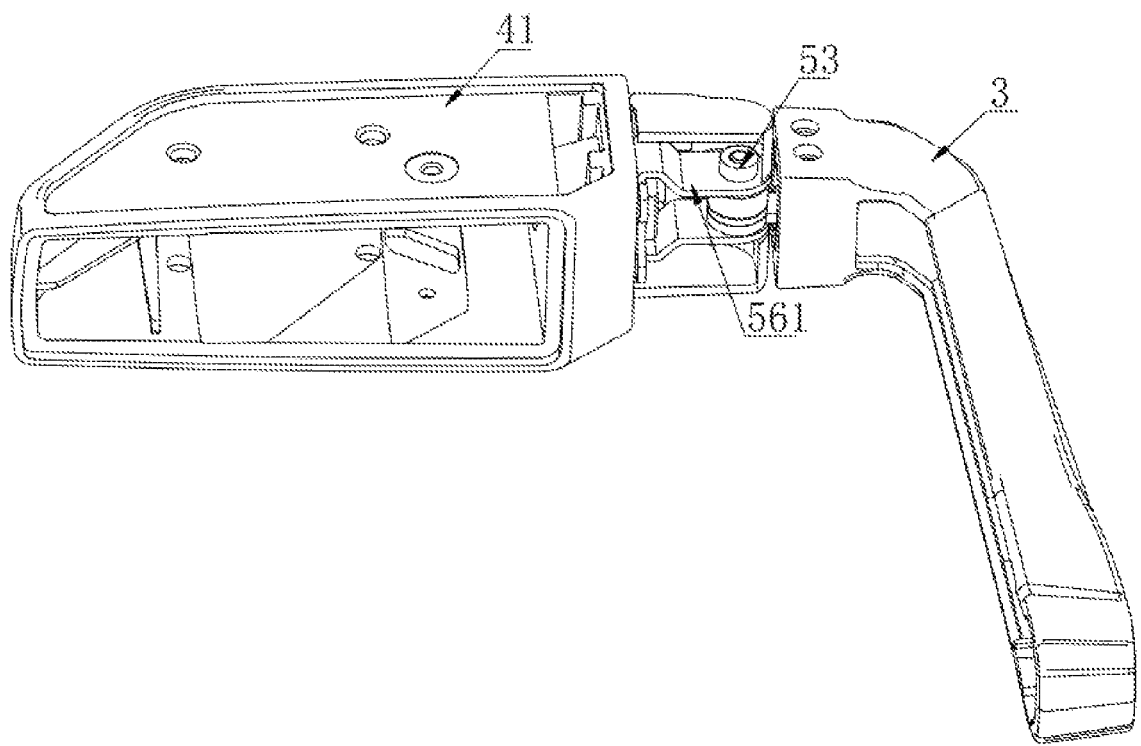
FIG. 9 is a schematic diagram of Embodiment 2 of the AI head-mounted computer according to the invention.
Figure 10:
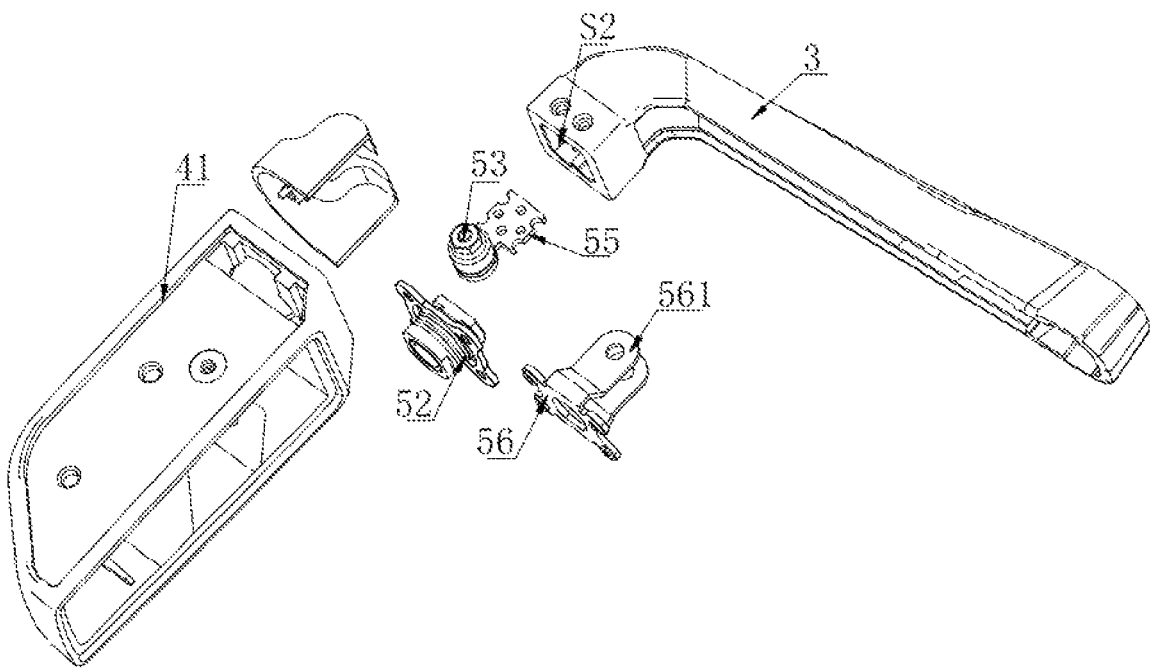
FIG. 10 is a schematic diagram of disassembly of Embodiment 2 of the AI head-mounted computer according to the invention.

With reference to FIGS. 9 and 10, the second connecting shaft 53 is arranged outside the second connecting arm 3; one end of the second connecting shaft 53 is connected to the second connecting arm 3 through a first connecting plate 55; specifically, one end of the first connecting plate 55 is connected to the second connecting shaft 53 for coaxial rotation, and the other end thereof extends into the second connecting arm 3 and is fixed with the inner wall of the second connecting arm 3; a second gap S2 is provided between the second connecting arm 3 and the second connecting shaft 53, and the second gap S2 forms part of the cable channel; the outer side end of the cable enters the hollow inner cavity of the first connecting shaft 52 through the second gap S2; the first connecting shaft 52 and the second connecting shaft 53 are connected through a second shaft connecting part 56 in the connecting assembly 5; specifically, one end of the second shaft connecting part 56 is fixedly mounted on the end of the display 4, and is coaxially rotatably matched with the first connecting shaft 52; two second supporting plates 561, which are respectively rotatably matched with the ends of the second connecting shaft 53, are formed on the successive surfaces of the end of the shaft connecting part 56 facing the second connecting shaft 53.

Embodiment 3

Figure 11:
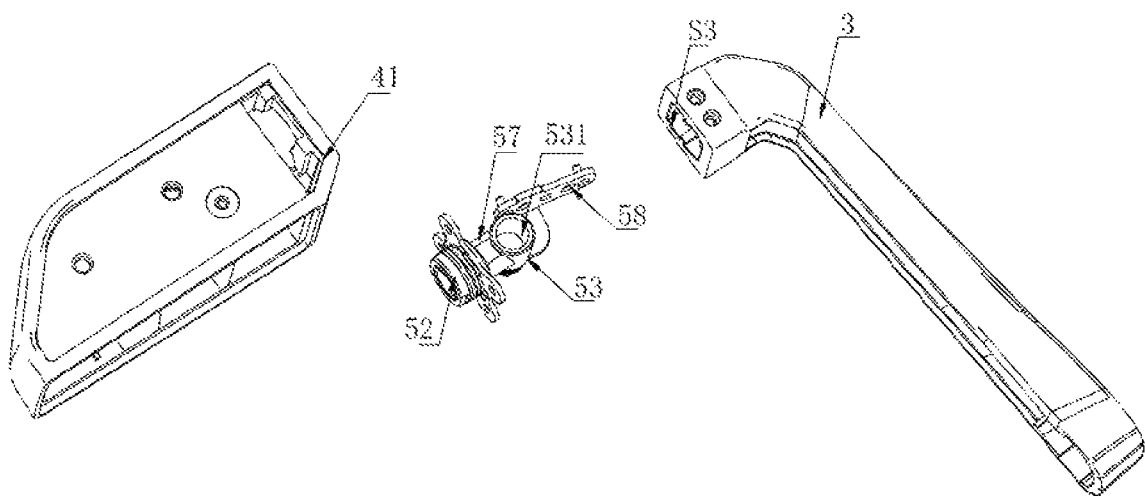
FIG. 11 is a schematic diagram of disassembly of Embodiment 3 of the AI head-mounted computer according to the invention.

With reference to FIG. 11, the second connecting shaft 53 is arranged inside the second connecting arm 3; a third gap S3 is provided between one end of the second connecting shaft 53 and the side inner wall of the second connecting arm 3, and the end of the second connecting shaft 53 is recessed inward in the axial direction to form a groove 531; the first connecting shaft 52 and the second connecting shaft 53 are connected through a third connecting shaft 57, and both ends of the inner cavity of the third connecting shaft 57 are respectively communicated with the hollow inner cavity of the first connecting shaft 52 and the groove 531 of the second connecting shaft 53 to form part of the cable channel 51; the front end of the cable extends into the groove 531 from the third gap S3, then enters the third connecting shaft 57 through the groove 531, and enters the hollow cavity of the first connecting shaft 52 after passing through the third connecting shaft 57, and then enter the display 4; in this way, all cables between the display 4 and the second connecting arm 3 can be hidden and protected.

In the above Embodiment 1 and Embodiment 3, one end of the second connecting shaft 53 is fixed to the side inner wall of the second connecting arm 3 through the third shaft connecting part 58; specifically, the third shaft connecting part 58 is a plate-like structure adapted to the inner wall of the second connecting arm 3, one end of which is rotatably matched with one end of the second connecting shaft 53, and the other end thereof extends into the second connecting arm 3 and is fixed to the inner wall thereof; it should be noted that in Embodiment 3, the end of the third shaft connecting part 58 that is rotatably connected to the second connecting shaft 53 is the end opposite to the notch of the groove 531.

Embodiment 4

Figure 12:
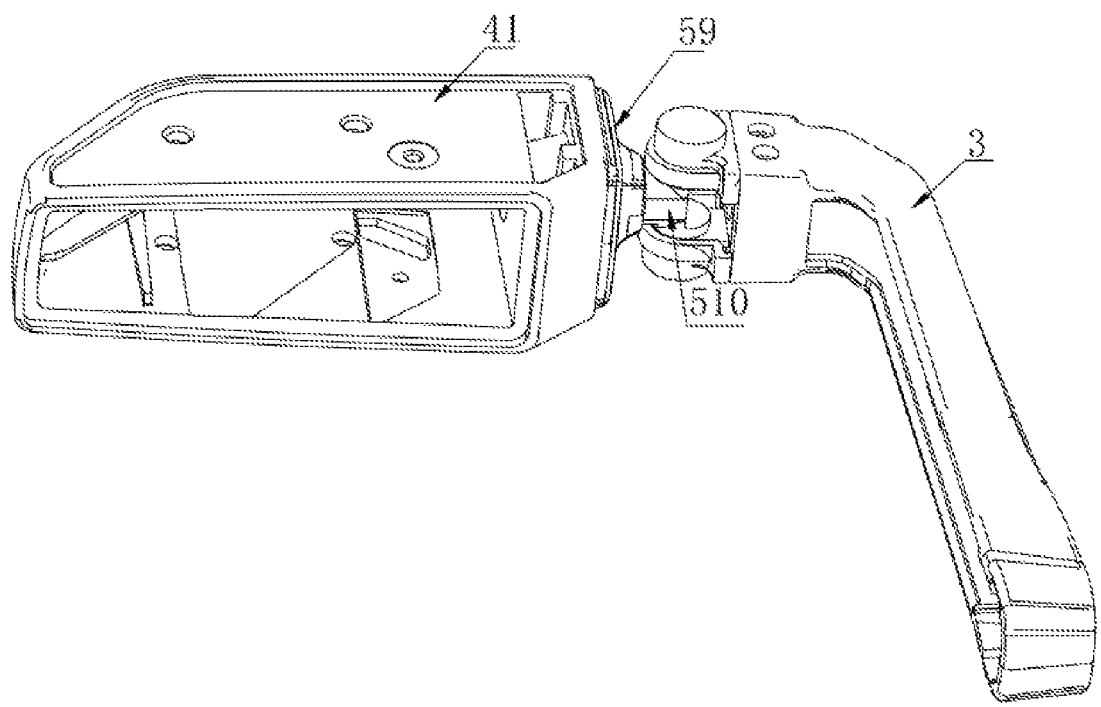
FIG. 12 is a schematic diagram of Embodiment 4 of the AI head-mounted computer according to the invention.
Figure 13:
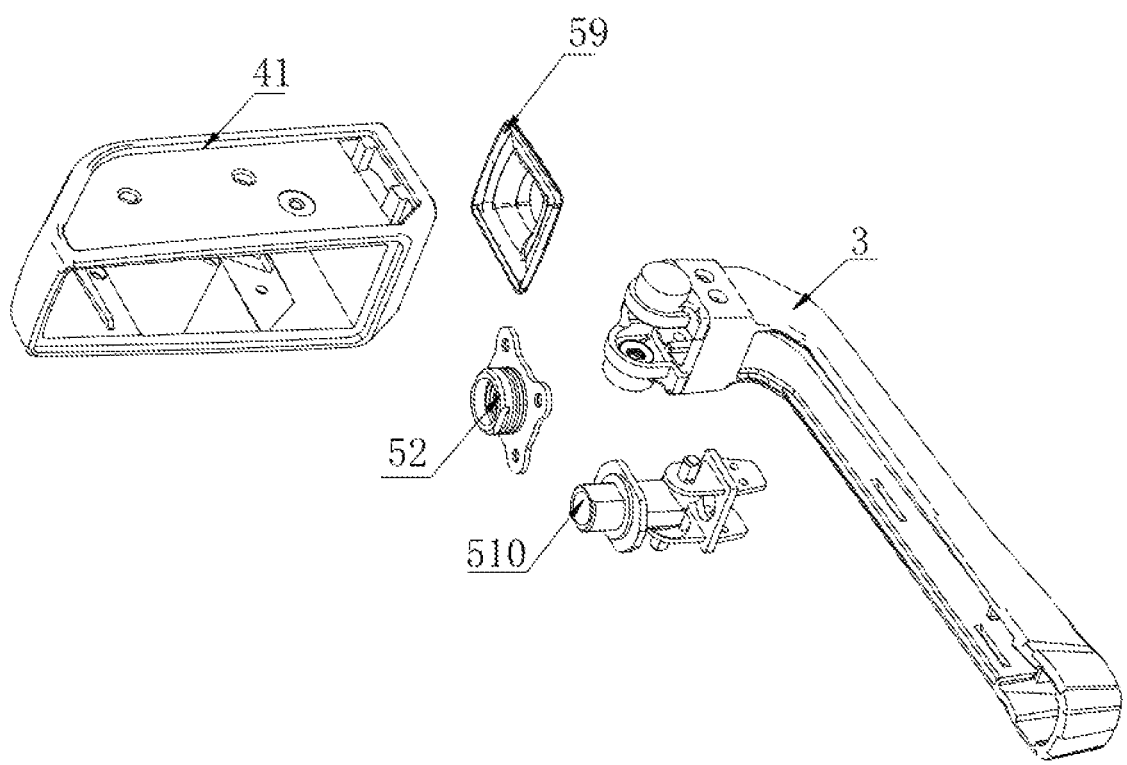
FIG. 13 is a schematic diagram of disassembly of Embodiment 4 of the AI head-mounted computer according to the invention.

With reference to FIGS. 12 and 13, the second connecting shaft 53 is located outside the second connecting arm 3, and the outside thereof is sleeved with a shaft sleeve 59; one end of the shaft sleeve 59 is fixed at the end of the display 4; one end of the first connecting shaft 52 facing the second connecting arm 3 is located in the shaft sleeve 59 and is covered by the shaft sleeve 59; the shaft sleeve 59 is provided with a shaft sleeve cavity communicating with the hollow inner cavity of the first connecting arm 3; the other end of the shaft sleeve 59 is coaxially and rotatably matched with a fourth shaft connecting part 510; the end of the fourth shaft connecting part 510 extends into the second connecting arm 3 and is fixed with the second connecting arm 3, and the fourth shaft connecting part 510 communicates the shaft sleeve cavity with the inner cavity of the second connecting arm 3 through a provided through hole; the outer end of the cable extends into the sleeve cavity from the via hole 61, and extends into the hollow cavity of the first connecting shaft 52 from the sleeve cavity, and then enters the display 4.

By adopting the solutions of the above four embodiments, the cable channel 51 between the display 4 and the second connecting arm 3 is optimally designed; under the premise of not affecting the cable routing, the cable can be well matched with the display 4 during the process of adjusting the display 4 by rotation, and at the same time, the cable can be better protected; furthermore, not only the rotation of the display 4, the second connecting arm 3, and the first connecting arm 2 relative to the main body part 1 can realize the unfolding of the AI head-mounted computer; especially after it is stored, the display 4 is rotated to be inverted upside down on the second connecting arm 3 relative to the second connecting arm 3, and then the second connecting arm 3 is rotated to one side of the main body part 1, so that the size of the overall AI head-mounted computer can be reduced, the user can put the AI head-mounted computer directly into the pocket; at the same time, the display screen of the display 4 which is inverted upside down on the second connecting arm 3 is blocked by the second connecting arm 3, which can better protect the display 4 and is convenient for the user to carry.

Further, in order to improve convenience:

With reference to FIG. 3-6, the first connecting arm 2 is divided into a first part 21 and a second part 22 from the middle part, and the first part 21 and the second part 22 are rotatably matched, so that the first part 21 and the second part 22 can be rotated to a state of being stacked with each other, and the second connecting arm 3 and the display 4 can be rotated into an accommodating groove 7 provided on the main body part 1; on the basis that the first part 21 and the second part 22 are folded in the above manner, the first part 21 and the second part 22 in the stacked state are swung toward the surface of the main body part 1 with the axis of rotation between the first connecting arm 2 and the main body part 1; furthermore, in the width direction of the main body part 1, the first connecting arm 2, the second connecting arm 3, and the display 4 can be accommodated in the main body part 1, so that the overall size of the AI head-mounted computer is smaller and more convenient to carry; at the same time, after the storage is completed, the first part 21 and the second part 22 are located between the second connecting arm 3 and the main body part 1, and the first part 21 and the second part 22 are respectively restricted by the main body part 1, the second connecting arm 3, and the display 4 in their rotatable directions, so that they cannot continue to rotate, further, the limit for the first part 21 and the second part 22 is automatically formed; at the same time, after the first part 21 and the second part 22 are restrained in their rotatable directions, the display 4 and the second connecting arm 3 are restrained at the same time, so that the display 4 is fixed in the accommodating groove 7; in this way, not only fixing is realized while being stored, but also the structure is very simple and the design is ingenious and reasonable.

A first arc-shaped cover 211 is fixed at one end of the first part 21 opposite to the second part 22, and a second arc-shaped cover 221 is provided outside the first arc-shaped cover 211; the second arc-shaped cover 221 is rotatably arranged on the first part 21, and the rotation axis of the second arc-shaped cover 221 coincides with the rotation axis between the first part 21 and the second part 22; the first arc-shaped cover 211 and the second arc-shaped cover 221 are provided with a punched hole 23 for cables to pass through; when the second part 22 is rotated relative to the first part 21 to realize the folding process, and when the second part 22 is rotated by 90°, one end of the second part 22 will contact the second arc-shaped cover 221; and in the process of continuing to rotate 90°, the second arc-shaped cover 221 is driven to follow it to rotate, so that the second arc-shaped cover 221 presents a process of unfolding with the first arc-shaped cover 211; during this process, the cable leaves the second arc-shaped cover 221 from the punched hole 23, and the unfolded first arc-shaped cover 211 cooperates with the second arc-shaped cover 221 to shield the exposed part of the end of the first part 21 and the second part 22 rotatably connected to realize the shielding of the cable; it should be noted that in the process of unfolding the first part 21 and the second part 22, the cable will re-enter the punched hole 23; at this time, only one end of the punched hole 23 needs to penetrate the first arc-shaped cover 211 and the second arc-shaped cover 221; when the second part 22 is rotated by 90°, one side of the second arc-shaped cover 221 is in contact with one side inner wall of the second part 22, and during the next 90° rotation of the second part 22, the second part 22 will push the second arc-shaped cover 221 to follow it to rotate 90°, so that it re-covers the first arc-shaped cover 211; with the above solution, the main function is that after the first part 21 and the second part 22 are folded by rotating, the first arc-shaped cover 211 and the second arc-shaped cover 221 cooperate to block the cables; at the same time, the setting of the punched hole 23 facilitates the cable routing when the first part 21 and the second part 22 are unfolded, and also facilitates the movement of the cable during the unfolding or storage of the first part 21 and the second part 22; in addition, the setting of the first arc-shaped cover 211 and the second arc-shaped cover 221 does not affect the unfolding and storage of the first part 21 and the second part 22; in addition, since the first part 21 and the second part 22 have wall thicknesses, therefore, when the second arc-shaped cover 221 covers the outer side of the first arc-shaped cover 211, and when the top end of the second arc-shaped cover 221 extends into the first part 21 for a distance along the circumferential direction, the bottom end of the second arc-shaped cover 221 is in contact with the inner wall of the second part 22, so that the radian of the second arc-shaped cover 221 is 90°; as a further explanation of the solution above, the first arc-shaped cover 211 and the second arc-shaped cover 221 comprise an arc-shaped part and a fan-shaped part arranged on both sides of the arc-shaped part and distributed along the width direction of the first part 21 and the second part 22; specifically, the upper end of the outer surface of the second arc-shaped cover 221 extends outward to form a protruding part 24; when the second part 22 is rotated 90° during the folding process of the first part 21 and the second part 22, the protruding part 24 is blocked by the end of the second part 22, so that the second part 22 will drive the second arc-shaped cover 221 to rotate during the subsequent rotation process.

The first part 21 is provided with a limiting slot 25, and the second part 22 is provided with a slidable limiting block 26 through the installation slot 27; both the installation slot 27 and the limiting slot 25 are set to that the width of the slot is smaller than the width of the inner cavity, and the limiting block 26 is set to fit with the limiting slot 25 and the installation slot 27; the outer surface of the limiting block 26 is flush with the outer surface of the second part 22 and the outer surface of the first part 21, and by pushing the limiting block 26, one end of the limiting block 26 can be inserted into the limiting slot 25; when the limiting block 26 is inserted into the limiting slot 25 to the maximum depth, the other end of the limiting block 26 is located within the range of the second part 22; in this way, the unfolded first part 21 and the second part 22 can be fixed to maintain a stable unfolded state of the two; at this time, the limiting slot 25 and the limiting block 26 are respectively arranged on the first part 21 and the second part 22 on the surface that is in contact with the first part 21 and the second part 22 when the first part 21 and the second part 22 are folded; in this way, during the folding process, the end of the limiting block 26 located in the installation slot 27 will be blocked by the second part 22 to prevent the limiting block 26 from being detached from the installation slot 27.

If certain terms are used in the description and claims to refer to specific components, those skilled in the art should understand that hardware manufacturers may use different terms to refer to the same component. The description and claims do not use the difference in name as a way to distinguish components, but use the difference in function of the components as a criterion for distinguishing. As mentioned in the entire specification and claims, "comprising" is an open-ended term, so it should be interpreted as "including but not limited to". "Approximately" means that within an acceptable error range, those skilled in the art can solve technical problems within a certain error range, and basically achieve technical effects.

It should be noted that the terms "comprising", "including" or any other variation thereof are intended to encompass non-exclusive inclusion, such that a commodity or system comprising a series of elements includes not only those elements, and also includes other elements not expressly listed, or elements inherent to the commodity or system. Without further limitation, an element qualified by the phrase "comprising a . . . " does not preclude the presence of additional identical elements in the commodity or system that includes the element.

The foregoing specification illustrates and describes several preferred embodiments of the invention. However, as previously mentioned, it should be understood that he invention is not limited to the form disclosed herein and should not be construed as an exclusion of other embodiments, but may be used in various other combinations, modifications and environments, and may be modified within the scope of the inventive concept described herein by virtue of the above teachings or skill or knowledge in the relevant field.

The invention claimed is:

1. An AI head-mounted computer, comprising a main body part and a display connected on the main body part through a first connecting arm and a second connecting arm, wherein the main body part, the first connecting arm, and the second connecting arm are sequentially and rotatably matched, and the rotating planes of the main body part, the first connecting arm, and the second connecting arm are the same plane; the display is connected to the second connecting arm through a connecting assembly; one end of the connecting assembly is rotatably matched with the second connecting arm, so that the display can rotate on a plane perpendicular to a plane where the second connecting arm rotates; the other end of the connecting assembly is rotatably matched with the display; the connecting assembly is provided with a cable channel, so that an outer side end of the cable enters the display from the second connecting arm, and other end of the cable sequentially passes through the second connecting arm and the first connecting arm and is connected to a chip in the main body part;

wherein the connecting assembly comprises a first connecting shaft and a second connecting shaft arranged vertically: the first connecting shaft is rotatably matched with the display; the second connecting shaft is rotatably matched with the second connecting arm, and the first connecting shaft and the second connecting shaft are rotatably matched, so that the first connecting shaft can be rotated relative to the second connecting shaft, thereby driving the display to rotate on the plane perpendicular to the plane where the second connecting arm rotates.

2. The AI head-mounted computer of claim 1, wherein the first connecting shaft is provided with a hollow inner cavity, and the hollow inner cavity forms part of the cable channel.

3. The AI head-mounted computer of claim 2, wherein the second connecting shaft is arranged inside the second connecting arm; a first gap is provided between the inner walls on both sides of the second connecting arm and the radially corresponding side of the second connecting shaft, and the first gap forms part of the cable channel; the end of the display is provided with a cover, and one end of the cover extends into one of the first gaps and blocks the first gap; the outer side end of the cable enters into the hollow inner cavity of the first connecting shaft through another first gap; the first connecting shaft and the second connecting shaft are connected through a first shaft connecting part in the connecting assembly.

4. The AI head-mounted computer of claim 2, wherein the second connecting shaft is arranged outside the second connecting arm; a second gap is provided between the second connecting arm and the second connecting shaft, and the second gap forms part of the cable channel; the outer side end of the cable enters the hollow inner cavity of the first connecting shaft through the second gap; the first connecting shaft and the second connecting shaft are connected through a second shaft connecting part in the connecting assembly.

5. The AI head-mounted computer of claim 2, wherein the second connecting shaft is arranged inside the second connecting arm; a third gap is provided between one end of the second connecting shaft and the side inner wall of the second connecting arm, and the end of the second connecting shaft is recessed inward in the axial direction to form a groove; the first connecting shaft and the second connecting shaft are connected through a third connecting shaft, and both ends of the inner cavity of the third connecting shaft are respectively communicated with the hollow inner cavity of the first connecting shaft and the groove of the second connecting shaft to form part of the cable channel.

6. The AI head-mounted computer of claim 3, wherein one end of the second connecting shaft is fixed to the side inner wall of the second connecting arm through the third shaft connecting part.

7. The AI head-mounted computer of claim 2, wherein the second connecting shaft is located outside the second connecting arm, and the outside thereof is sleeved with a shaft sleeve; one end of the shaft sleeve is fixed at the end of the display; the shaft sleeve is provided with a shaft sleeve cavity communicating with the hollow inner cavity of the first connecting arm; the other end of the shaft sleeve is coaxially and rotatably matched with a fourth shaft connecting part; the end of the fourth shaft connecting part extends into the second connecting arm and is fixed with the second connecting arm, and the fourth shaft connecting part communicates the shaft sleeve cavity with the inner cavity of the second connecting arm through a provided through hole.

8. The AI head-mounted computer of claim 1, wherein the first connecting arm is divided into a first part and a second part from middle part, and the first part and the second part are rotatably matched, so that the first part and the second part can be rotated to a state of being stacked with each other, and the second connecting arm and the display can be rotated into an accommodating groove provided on the main body part.

* * * * *